United States Patent Office 3,264,274
Patented August 2, 1966

3,264,274
DIPERESTERS OF POLYOLS
Newton G. Leveskis, Richmond, Calif., assignor to U.S.
Peroxygen Corporation, Richmond, Calif.
No Drawing. Filed Nov. 18, 1963, Ser. No. 324,244
17 Claims. (Cl. 260—80)

This invention relates to organic peroxides. More particularly, it relates to novel aliphatic peroxide di-esters, their method of preparation, and their method of use.

This application is a continuation-in-part of copending patent application, Serial No. 140,987, filed September 27, 1961, and now abandoned.

The principal object of the present invention is to provide a new group of organic peroxide diesters. In general, the practical application of these novel organic peroxides is in the field of catalysis where they are employed as free radical catalysts. This aspect will be more fully treated hereinafter.

The novel compounds of this invention broadly comprise aliphatic diperesters of polyhydric alkanols. A preferred group (as later explained) includes alkyl diperesters of dihydric alkanols wherein the alpha carbon atoms of said alkyl groups are secondary or tertiary carbon atoms.

The present compounds are not merely a new group of organic peroxides. It has been found that the present compounds have significant advantages even over such closely related materials as aryl diperesters of alkanediols. When used as catalysts for the formations of resins from monomers such as the vinyls for example, the present compounds cause substantially less discoloration than the analogous aromatic diperesters such as the diperbenzoates of alkanediols. This yields a more desirable resin end product since discoloration has always been of concern in the production of resins and efforts have been made to avoid it.

In exploring this discoloration reduction phenomenon, a further discovery was made. The preferred compounds containing the secondary or tertiary carbon atom noted above contributes markedly less discoloration to the resin end product.

Another preferred group of the present materials has an additional important attribute in its compatibility and solubility with monomers to which its members are added for catalytic purposes. These materials are identified as alkyl diperesters of alkanediols having up to about 12 carbon atoms in the alkyl groups. These preferred materials, while having all of the other functional advantages of related diperesters of alkanediols, are also liquids under normal conditions of use. Since the monomers most frequently used such as alkyl phthalates are liquid or easily brought into a solution with a solvent, these preferred peroxides are easily mixed with the monomer avoiding previously encountered solubility problems of solid catalysts. Obviously where the catalyst is not properly mixed with the monomer, optimum catalysis cannot occur. The significance of this aspect of the invention is demonstrated by observed shorter gell times when using one of the preferred materials.

The peculiar structure of a diperester of a polyol has been found to have certain other surprising and unexpectedly desirable properties. For example, when the diperester is used as a catalyst in a polymerization reaction, there is a breakdown of the peroxide with time which results in the reformation of the polyol. It has been found that this breakdown occurs stepwise with the compounds of this invention.

Thus, only one of the two reactive sites at a time is hydrolyzed to the alcohol with the second site still retaining the peroxy ester structure. It has been observed that the second peroxy group remains exceptionally stable and lasts for an unexpectedly long period of time under normal reaction conditions.

It is believed that the formation of the alcohol at one site imparts an over-all stability to the molecule which inhibits the breakdown of the remaining peroxy linkage. This phenomenon is in marked contrast with the rate of breakdown of diperesters of poly basic acids and of the rate of breakdown of monoperesters.

A further advantage of the present peroxy compounds is in their ease of preparation. As will become obvious hereinafter from the description of the specific preparation of compounds within the scope of this invention, the compounds are readily prepared under extremely mild conditions and in excellent yields.

Considering the present compounds as a unit, the invention may be considered as including diperesters having the following general structural formula:

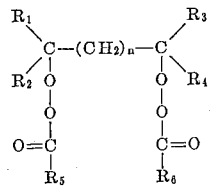

wherein $R_1$, $R_2$, $R_3$, and $R_4$ are individually selected from the group consisting of the hydrogen atom and the alkyl radicals. Preferably each R is a lower alkyl radical, i.e., one having from about 1–5 carbon atoms which may be in a straight chain or branched.

It is preferred that $n$ be a small positive integer from 1 to about 5, although it is possible for $n$ to equal 0 or be greater than 5. As noted above, one advantageous property of the present compounds is that the second peroxy group is relatively stable after the hydrolysis of the first peroxy group to an alcohol. It is believed that the formation of the hydroxy group is responsible for the stability of the remaining peroxy group. Therefore, the hydroxy group is preferably not too far removed in the molecule from the remaining peroxy group so that it may impart its stabilizing effect thereto. Accordingly, the length of the alkylene group linking the two carbon atoms to which the peroxy groups are linked is preferably of a relatively short length.

$R_5$ and $R_6$ may be the same or different aliphatic radicals having non-interfering substituents as desired. Compounds of greatest present commercial interest are those where $R_5$ and $R_6$ are alkyl groups of about 1 to 20 carbon atoms such as the methyl, ethyl, propyl, isobutyl, decyl, or eicosyl radicals. To take advantage of the solubility of these catalysts with monomers, it is desirable to limit $R_5$ and $R_6$ to about 12 carbon atoms.

Where it is desired to avoid discoloration as much as possible in a catalyzed resin end product, a catalyst selected from those encompassed by the following formula should be used:

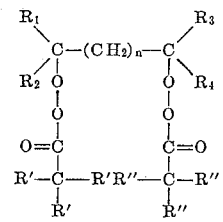

where $R_1$, $R_2$, $R_3$, $R_4$ and $n$ have the definitions given above and R' and R'' is selected from the hydrogen atom and alkyl radicals, provided that at least two R' and two R'' are alkyl radicals.

Hence, it is seen that each carbon atom attached directly to the carbonyl group, i.e., the alpha carbon atom, is either a secondary or tertiary carbon atom.

As before, it is preferred that the 3 R''s and the 3 R'''s total not more than about 19 carbon atoms so that each of the alkyl groups attached directly to the carbonyl groups are limited to about 20 carbon atoms.

Typical examples of compounds within the scope of the present invention therefore include the following among many others:

2,5-dimethyl hexyl-2,5-diperpropionate
2,5-diethyl hexyl-2,5-diperpelargonate
2-methyl-5-propyl hexyl-2,5-diperneopentanoate
3-butyl-4-methyl pentyl-2,3-diperdodecanoate
2-methyl-5-chloroethyl hexyl-2,5-diperdecanoate
2,5-dimethyl hexyl-2,5-diper (2-ethyl hexanoate)
2,5-dimethyl hexyl-2,5-diperoctanoate
2,5-dimethyl hexyl-2,4-diperbutyrate
2,5-dimethyl hexyl-2,5-diperneopentanoate
2,5-dimethyl hexyl-2,4-diperacetate
2,5-dimethyl octyl-2,5-diperlaurate The present compounds are prepared by a relatively straightforward method which comprises reacting the corresponding dihydroperoxide of the corresponding dihydric alcohol with an acid halide of the corresponding carboxylic acid to form the desired ester. The carboxylic acid itself could be used, of course, but the acid halide is much preferred for ease of ester formation. It is also possible to use an acid anhydride as will be shown.

The reaction is executed in a suitable solvent such as chloroform. When the acid halide is used, an organic or inorganic base is employed to neutralize the acid liberated in the esterification reaction. The base is suitably employed in excess. The reaction proceeds fairly rapidly in most cases and is complete within several hours. In most instances no heat need be applied, although in the formation of certain of the compounds slight warming may be desirable.

In many other cases it is desirable to cool the reaction mixture to prevent development of excessive heat for the peroxide being formed. Also, there are many suitable reactants that may require no solvent.

Normally the same ester group will be desired at both sites of the molecule. In that case at least 2 moles of the acid halide is used for each mole of the dihydric polyol. If mixed esters are sought, one mole of each of the acid halides selected are reacted with one mole of a dihydric polyol.

*Example I.—Preparation of $C_7$, $C_8$, $C_9$ peresters of 2,5-dimethyl hexol-2,5-dihydro peroxide*

The esters were prepared by the following general reaction.

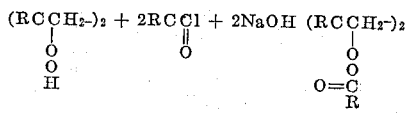

Materials used:
  Hydroperoxide—1.78 gm.
  Acid chloride—5.2 gm. (three samples containing respectively the material where R=7, 8 and 9 carbon atoms in a straight chain)
  Solid sodium hydroxide—1.6 gm.

The esters noted below were prepared as follows:

To a 100 ml. beaker containing the hydroperoxide 25 grams of water was added. Following this 1.6 grams of the solid sodium hydroxide was added 3 drops of X100 emulsifier and three drops of pyridine. Over a one-half hour period the selected acid chloride was gradually added. The end of the acid chloride addition was 8 as determined on pH paper. The organic liquid phase was washed with potassium hydroxide solution and then with water until a neutral pH was obtained. The product was then treated with weak acid and again washed until neutral. The perester product was dried over sodium sulfate and filtered. The products obtained were as follows:

2,5-dimethyl hexane - 2,5 - diperpelargonate—a liquid at −15° C. refractive index (20° C.) 1.4533; D20° C./20° C. .956

2,5-dimethyl hexane - 2,5-diperoctanoate—active oxygen content 7.43% refractive index (20° C.) 1.4505; D20° C./20° C. .959

2,5-dimethyl hexane - 2,5-diperdecanoate—melting point 4–6° C. refractive index (20° C.) 1.4541; D20° C./20° C. .945.

*Example II*

The procedure of Example I was again followed for preparing the below listed diperesters with the exception that the amount of sodium hydroxide was used in equimolar amounts on the acid chloride. The acid chlorides used were: dodecanoyl chloride, neopentanoyl chloride, 2-ethyl hexanoyl chloride.

The products obtained were as follows:

Product No. 1.—2,5-dimethyl hexane - 2,5-diperdodecanoate.
Melting point +11–12° C.
Refractive index (20° C.) 1.4544; D20° C./20° C. .954

Product No. 2.—2,5-dimethyl hexane - 2,5-diperneopentanoate.
Liquid at −15° C.
Refractive index (20° C.) 1.4406; D20° C./20° C. .984

Product No. 3.—2,5-dimethyl hexane - 2,5-diper (2-ethylhexanoate).
Liquid at −15° C.
Refractive index (20° C.) 1.4463; D20° C./20° C. .945

*Example III.—Preparation of propionate ester*

To a 100 ml. beaker 25 grams of water was added. To this there was added in the listed order 10 grams of ice, 1.6 grams of sodium hydroxide, 1.78 grams of 2,5-dimethyl hexane - 2,5-dihydroperoxide and 5.2 grams of propionic anhydride. The liquid organic layer was washed twice with potassium hydroxide in water (10%). The organic layer was then washed five times with distilled water until neutral. This was followed by washing with 5% sulphuric acid and finally again with five washes of distilled water. The organic liquid product was vacuumed at 5 mm. of mercury for 16 hours.

The 2,5-dimethyl hexane, 2,5-diperpropionate product was liquid at −15° C. It had a refractive index of (20° C.) 1.4413; D 20° C./20° C. 1.032. The active oxygen content was 11.2%.

*Example IV.—Preparation of 2,5-dimethyl hexyl-2,5-diperlaurate*

.4 gram of 2,5-dimethyl hexyl -2,5-dihydroperoxide were placed in a test tube and dissolved in 2 ml. of pyridine and 2 ml. of chloroform. Slowly, 1 gram of lauroyl chloride was added with shaking. The mixture was allowed to stand over night. The reaction mixture was then washed with dilute sodium bicarbonate and 3 times with 4 ml. of water. The solvents were vacuumed off and a liquid remained. The liquid froze at 12° C. and had a density of .920 20° C./20° C. The active oxygen of the liquid was 5.4% (theoretical active oxygen equals 5.92%).

The low active oxygen obtained in this example was due to the presence of lauric acid.

*Example V*

This example will illustrate the significant reduction in discoloration of resin end products prepared with the use of the present materials as catalysts. Two monomers were selected of the vinyl variety to illustrate this advantageous property. The two materials selected were those of a great present commercial concern, namely, diallyl isophthalate and diallyl terephthalate. The individual peresters listed in the table below were handled in the following manner:

To 56 grams of the diallyl monomers was added 1 gram of perester. This mixture was placed in a thermostated bath, the temperature being set at 100° C. When the monomer had just gelled it was removed (this occurred in about two to three hours). It was then placed in another oven maintained at 200° C. for five minutes in order to complete the polymerization. The samples were then checked for color difference. Results are reported by numerical values in accordance with the Gardner Color Scale. For comparison, and in order to point out the advantages of the present materials, 2,5-dimethyl hexane -2,5-diperbenzoate was used with the two monomers noted in precisely the same way.

| Perester Catalyst | Diallyl Iso-phthalate | Diallyl Tere-phthalate |
|---|---|---|
| 2,5-dimethylhexane-2,5-diperpropionate | -2 | 3 |
| 2,5-dimethylhexane-2,5-diperpelargonate | 2 | 2 |
| 2,5-dimethylhexane-2,5-diperneopentanoate | 1 | 1 |
| 2,5-dimethylhexane-2,5-diperdodecanoate | 2 | 2 |
| 2,5-dimethylhexane-2,5-diperdecanoate | 2 | -2 |
| 2,5-dimethylhexane-2,5-diper (2 ethyl hexanoate) | 1 | 1 |
| 2,5-dimethylhexane-2,5-diperoctanoate | -2 | 2 |
| 2,5-dimethylhexane-2,5-diperbenzoate | 3 | 4 |

As noted, the compounds of the present invention are most useful in catalyzing reactions that are initiated by the presence of free radicals. In other words, the compounds are used to catalyze free radical sensitive materials. In using the compounds at catalysts they are employed in the same manner as other known peroxides as to conditions and amount.

As in previous cases, the present peroxides may be used to catalyze such reactions as the polymerization of materials like the olefinically unsaturated hydrocarbons, acids, and esters, to catalyze auto oxidation, as a catalyst for telomerization, bromination, chlorination with sulfur chloride for example, halogenation with halogen gases, the addition of phosphorous or silicon compounds to olefins and acetylenes, the addition of alkoxy radical to conjugated systems, and the like. Preferred utility showing significantly improved results by way of lessening of discoloration is obtained with the described secondary and tertiary diperesters in the formation of resins with vinyl monomers.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. An alkyl diperester of a dihydric alkanol of the formula:

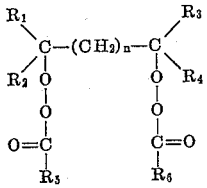

wherein $n$ is a positive integer from about 1 to 5, wherein $R_1$, $R_2$, $R_3$, and $R_4$ are individually selected from the group consisting of the hydrogen atom and alkyl radicals having from about 1–5 carbon atoms, and wherein $R_5$ and $R_6$ are individually selected from alkyl radicals branched at the alpha position having from about 3–20 carbon atoms.

2. A perester in accordance with claim 1 wherein $R_5$ and $R_6$ each contain 3–12 carbon atoms.

3. A perester in accordance with claim 1 wherein the alpha carbon atom of each of said $R_5$ and $R_6$ radicals is a secondary carbon atom.

4. A perester in accordance with claim 1 wherein the alpha carbon atom of said $R_5$ and $R_6$ radicals is a tertiary carbon atom.

5. An alkyl diperester of 2,5-dimethyl hexane-2,5-dihydroperoxide wherein said alkyl radicals are branched at the alpha position and each contain about 3–20 carbon atoms.

6. An alkyl diperester in accordance with claim 5 wherein said alkyl radicals contain about 3–12 carbon atoms.

7. An alkyl diperester in accordance with claim 5 wherein the alpha carbon atom of said alkyl radical is secondary.

8. An alkyl diperester in accordance with claim 5 wherein the alpha carbon atom of said alkyl radical is tertiary.

9. 2,5-dimethyl hexane-2,5-diperneopentanoate.

10. 2,5-dimethyl hexane-2,5-diper (2-ethylhexanoate).

11. A method for preparing a vinyl resin having minimum discoloration comprising subjecting a free radical catalyzable vinyl monomer to free radical polymerization conditions in the presence of a catalytic amount of the compound of claim 1.

12. A method for preparing a vinyl resin having minimum discoloration comprising subjecting a free radical catalyzable vinyl monomer to free radical polymerization conditions in the presence of a catalytic amount of the compound of claim 3.

13. A method for preparing a vinyl resin having minimum discoloration comprising subjecting a free radical catalyzable vinyl monomer to free radical polymerization conditions in the presence of a catalytic amount of the compound of claim 4.

14. A method for preparing a vinyl resin having minimum discoloration comprising subjecting a free radical catalyzable vinyl monomer to free radical polymerization conditions in the presence of a catalytic amount of the compound of claim 5.

15. A method for preparing a vinyl resin having minimum discoloration comprising subjecting a free radical catalyzable vinyl monomer to free radical polymerization conditions in the presence of a catalytic amount of the compound of claim 6.

16. A method for preparing a vinyl resin having minimum discoloration comprising subjecting a free radical catalyzable vinyl monomer to free radical polymerization conditions in the presence of a catalytic amount of the compound of claim 7.

17. A method for preparing a vinyl resin having minimum discoloration comprising subjecting a free radical catalyzable vinyl monomer to free radical polymerization conditions in the presence of a catalytic amount of the compound of claim 8.

References Cited by the Examiner

UNITED STATES PATENTS

| | | | |
|---|---|---|---|
| 2,464,062 | 3/1949 | Strain | 260—80 |
| 2,610,965 | 9/1952 | Vandenberg | 260—80 |
| 2,813,127 | 11/1957 | White | 260—610 |
| 2,857,030 | 10/1960 | Bankert | 260—610 |
| 3,096,310 | 7/1963 | Heiberger | 260—78.4 |
| 3,117,166 | 1/1964 | Harrison et al. | 260—86.1 |

OTHER REFERENCES

Criegee et al., Annalen der Chemie, vol. 560, pp. 135–141 (1948), page 141 relied on.

JOSEPH L. SCHOFER, *Primary Examiner.*

L. WOLF, *Assistant Examiner.*